(12) United States Patent
Wagaman et al.

(10) Patent No.: US 9,297,564 B2
(45) Date of Patent: Mar. 29, 2016

(54) REFRIGERANT RECOVERY UNIT WITH DIAGNOSTIC INTERFACE

(75) Inventors: Tim Wagaman, Owatonna, MN (US); Mark McMasters, Owatonna, MN (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 532 days.

(21) Appl. No.: 13/482,708

(22) Filed: May 29, 2012

(65) Prior Publication Data

US 2013/0319025 A1    Dec. 5, 2013

(51) Int. Cl.
*F25B 45/00* (2006.01)
*B60H 1/00* (2006.01)

(52) U.S. Cl.
CPC ............ *F25B 45/00* (2013.01); *B60H 1/00585* (2013.01); *F25B 2345/003* (2013.01)

(58) Field of Classification Search
CPC ........................... F25B 45/00; F25B 2345/003
USPC .............................. 62/77, 149, 292, 474, 475
See application file for complete search history.

(56) References Cited

U.S. PATENT DOCUMENTS

| 4,755,957 | A | * | 7/1988 | White et al. ................... 702/184 |
| 4,967,567 | A | * | 11/1990 | Proctor et al. .................. 62/127 |
| 2005/0159847 | A1 | | 7/2005 | Shah et al. |
| 2006/0130510 | A1 | | 6/2006 | Murray et al. |
| 2009/0055044 | A1 | | 2/2009 | Dienst |
| 2009/0105927 | A1 | | 4/2009 | Arai |
| 2010/0205450 | A1 | * | 8/2010 | Sarnacke et al. .............. 713/185 |

FOREIGN PATENT DOCUMENTS

DE             19626607         9/1997

* cited by examiner

*Primary Examiner* — Jonathan Bradford
(74) *Attorney, Agent, or Firm* — Baker & Hostetler LLP

(57) ABSTRACT

A refrigerant recovery unit is provided that is capable of communicating with a vehicle diagnostic tool. The diagnostic tool can retrieve vehicle information, such as vehicle identifying information or vehicle diagnostic information. The refrigerant recovery unit can diagnose the vehicle and provide fixes to the user using the database stored therein or from a remote location. The refrigerant recovery unit includes various hardware and software to communicate with electronic control units in the vehicle.

14 Claims, 7 Drawing Sheets

US 9,297,564 B2

REFRIGERANT RECOVERY UNIT WITH DIAGNOSTIC INTERFACE

FIELD OF THE DISCLOSURE

The disclosure generally relates to a refrigerant recovery unit. More particularly to a refrigerant recovery unit that gather vehicle information through a diagnostic tool, such as a vehicle communication interface.

BACKGROUND OF THE DISCLOSURE

Portable refrigerant recovery units or carts are used in connection with the service and maintenance of refrigeration systems, such as a vehicle's air conditioning system. The refrigerant recovery unit connects to the air conditioning system of the vehicle to recover refrigerant out of the system, separate out oil and contaminants from the refrigerant in order to recycle the refrigerant, and recharge the system with additional refrigerant.

Vehicle data, such as vehicle manufacturer, make and model are manually entered into the refrigerant recovery unit in order to properly service the vehicle. Taking time to enter vehicle information can be inefficient and the information may be entered incorrectly. Additionally, vehicle diagnostic data can be useful to servicing the vehicle, however, this is not currently being collected by a refrigerant recovery unit.

A need exists for a refrigerant recovery unit to receive vehicle identifying information and diagnostic data in order to properly service the vehicle.

SUMMARY OF THE DISCLOSURE

The foregoing needs are met, to a great extent, by the present disclosure, wherein in one aspect, a refrigerant recovery unit includes a diagnostic interface to interact with a vehicle diagnostic tool, such as a vehicle communication interface (VCI).

In accordance with certain aspects of the present invention, a refrigerant recovery unit is provided and can include a refrigerant storage unit configured to store a refrigerant, a refrigerant circuit configured to recover and recharge the refrigerant in a refrigerant system of a vehicle, a communication interface configured to communicate with a vehicle diagnostic tool, a processor configured to control the refrigerant recovery unit, a memory to store diagnostic software and operating software to operate the refrigerant recovery unit, and a pair of hoses configured to connect to the refrigerant system of the vehicle.

In accordance with other aspects of the present invention, a refrigerant recovery unit is provided and includes means for storing refrigerant, means for transferring refrigerant configured to recover and recharge the refrigerant in a refrigerant system of a vehicle, means for communicating configured to communicate with a vehicle diagnostic tool, means for controlling configured to control the refrigerant recovery unit, means for storing diagnostic software and operating software to operate the refrigerant recovery unit, and means for supplying refrigerant configured to connect to the refrigerant system of the vehicle.

In accordance with yet other aspects of the present invention, a refrigerant recovery unit is provided and includes a refrigerant storage unit configured to store a refrigerant, a refrigerant circuit configured to recover and recharge the refrigerant in a refrigerant system of a vehicle, a vehicle communication interface configured to communicate with a data link connector of a vehicle in a vehicle communication protocol, a processor configured to control the refrigerant recovery unit, a memory to store diagnostic software and operating software to operate the refrigerant recovery unit, and a pair of hoses configured to connect to the refrigerant system of the vehicle.

There has thus been outlined, rather broadly, certain aspects of the invention in order that the detailed description herein may be better understood, and in order that the present contribution to the art may be better appreciated.

In this respect, before explaining at least one embodiment of the invention in detail, it is to be understood that the invention is not limited in its application to the details of the construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE DISCLOSURE

A refrigerant recovery unit 100 is provided that includes an interface that communicates with a vehicle diagnostic tool. A vehicle can be any vehicle, such as automobile, trains, airplanes, ships and the like. The refrigerant recovery unit 100 communicates with the vehicle diagnostic tool to retrieve vehicle information, such as manufacturer, make and model. Additionally, vehicle diagnostic information can also be retrieved using the vehicle diagnostic tool.

Figure 1:
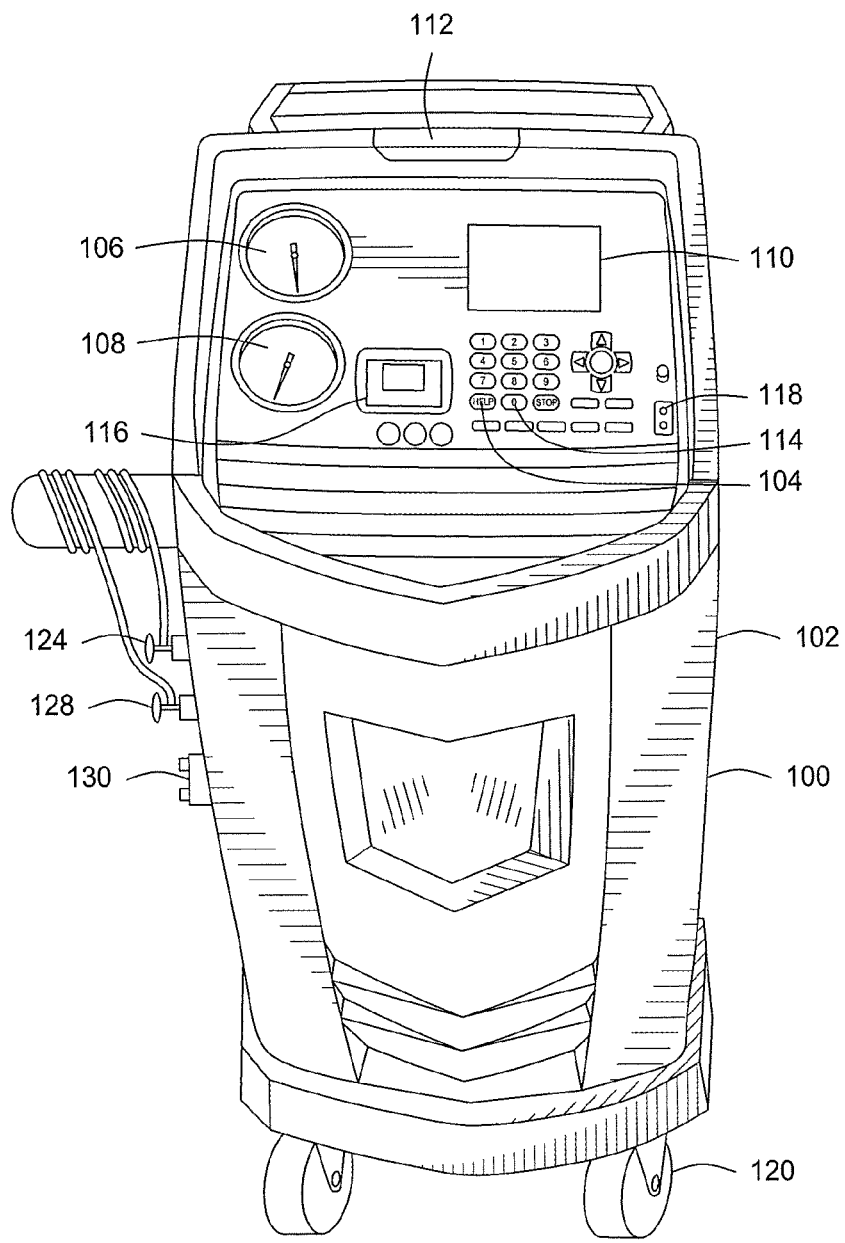
FIG. 1 is a perspective view of a refrigerant recovery unit in accordance with an embodiment of the invention.

FIG. 1 is a perspective view of a refrigerant recovery unit in accordance with an embodiment of the invention. The refrigerant recovery unit 100 can be the AC1234™ from Robinair™ based in Owatonna, Minn. (Service Solutions U.S. LLC). The refrigerant recovery unit 100 includes a cabinet 102 to house components of the system (See FIG. 2). The cabinet 102 may be made of any material such as thermoplastic, steel and the like.

The cabinet 102 includes a control panel 104 that allows the user to operate the refrigerant recovery unit 100. The control panel 104 may be part of the cabinet as shown in FIG. 1 or separated. The control panel 104 includes high and low gauges 106, 108, respectively. The gauges may be analog or digital as desired by the user. The control panel 104 has a display 110 to provide information to the user, such as certain operating status of the refrigerant recovery unit 100 or provide messages or menus to the user. Located near the display 110 are LEDs 112 to indicate to the user the operational status of the refrigerant recovery unit 100. The LEDs may indicate that the refrigerant recovery unit is in the recovery, recycling or recharging mode or indicate that the filter needs to be changed or that there is a malfunction.

A user interface 114 is also included on the control panel 104. The user interface 114 allows the user to interact and operate the refrigerant recovery unit 100 and can include an alphanumeric keypad and directional arrows. A printer 116 is provided to print out information, such as test results.

Figure 2:
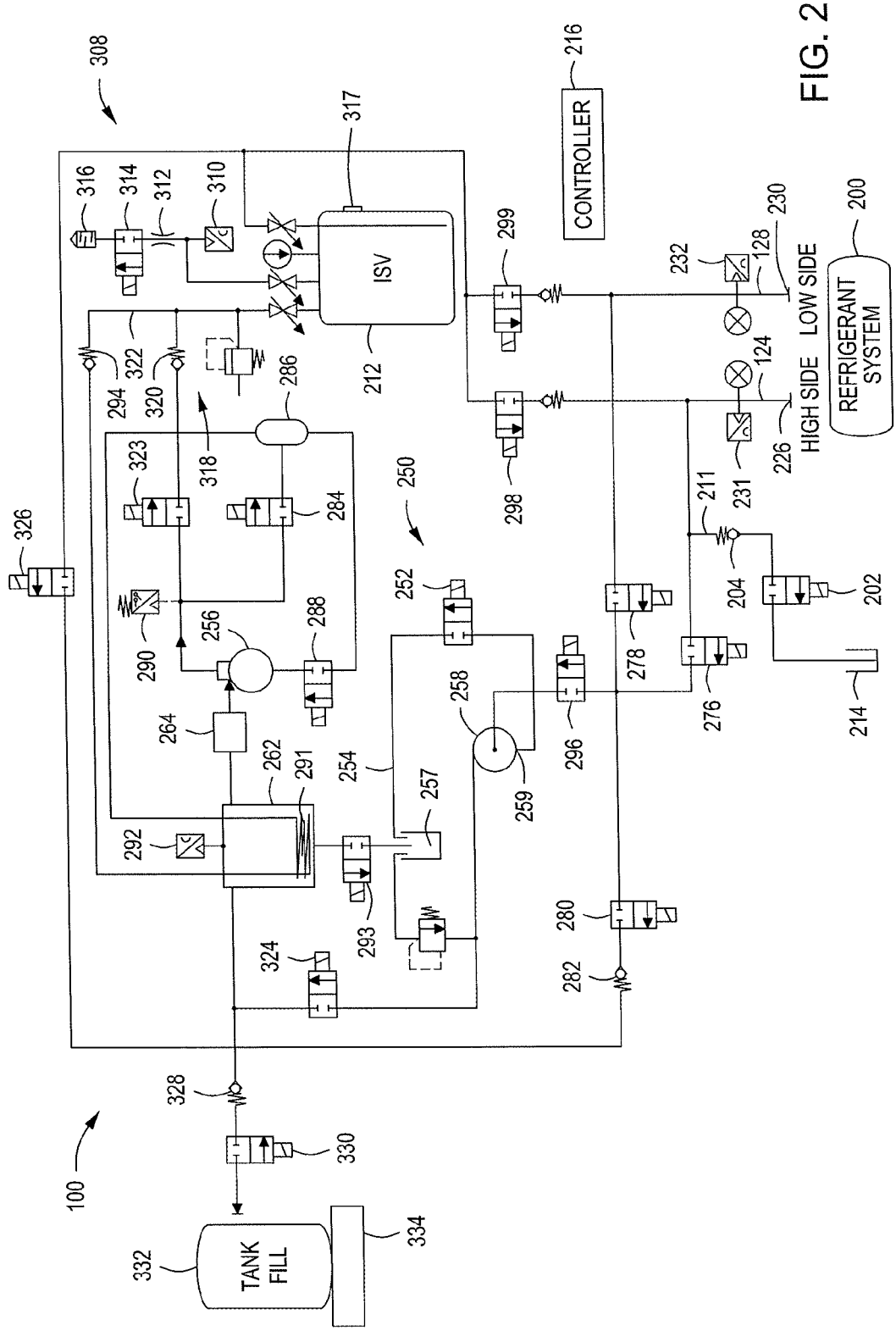
FIG. 2 illustrates components of the refrigerant recovery unit shown in FIG. 1 in accordance with another embodiment of invention.

The cabinet 102 further includes connections for hoses 124, 128 that connect the refrigerant recovery unit 100 to a refrigerant containing device, such as the vehicle's refrigerant system 200 (shown in FIG. 2). Also shown in FIG. 1, a vehicle connector interface 130 is provided so that a communication cable can be connected from the vehicle connector interface to a data link connector in the vehicle. This allows the refrigerant recovery unit 100 to communicate with the vehicle and diagnose any issues with it. In order for the refrigerant recovery unit 100 to be mobile, wheels 120 are provided at a bottom portion of the system.

FIG. 2 illustrates components of the refrigerant recovery unit 100 of FIG. 1 according to an embodiment of the present disclosure. In one embodiment, to recover refrigerant, service hoses 124 and 128 are coupled to the refrigeration system 200 of the vehicle, via couplers 226 (high side) and 230 (low side), respectively. The couplers are designed to be closed until they are coupled to the refrigerant system 200.

The recovery cycle is initiated by the opening of high pressure and low-pressure solenoids 276, 278, respectively. This allows the refrigerant within the vehicle's refrigeration system 200 to flow through a recovery valve 280 and a check valve 282. The refrigerant flows from the check valve 282 into a system oil separator 262, where it travels through a filter/dryer 264, to an input of a compressor 256. Refrigerant is drawn through the compressor 256 through a normal discharge solenoid 284 and through a compressor oil separator 286, which circulates oil back to the compressor 256 through an oil return valve 288. The refrigerant recovery unit 100 may include a high-pressure switch 290 in communication with a controller 216, which is programmed to determine an upper pressure limit, for example, 435 psi, to optionally shut down the compressor 256 to protect the compressor 256 from excessive pressure. The controller 216 can also be, for example, a microprocessor, a field programmable gate array (FPGA) or application-specific integrated circuit (ASIC). The controller 216 via a wired or wireless connection (not shown) controls the various valves and other components (e.g. vacuum, compressor) of the refrigerant recovery unit 100. In some embodiments of the present disclosure, any or all of the electronic solenoid or electrically activated valves may be connected and controlled by the controller 216.

A high-side clear solenoid 323 may optionally be coupled to the output of the compressor 256 to release the recovered refrigerant transferred from compressor 256 directly into a storage tank 212, instead of through a path through the normal discharge solenoid 284.

The heated compressed refrigerant exits the oil separator 286 and then travels through a loop of conduit or heat exchanger 291 for cooling or condensing. As the heated refrigerant flows through the heat exchanger 291, the heated refrigerant gives off heat to the cold refrigerant in the system oil separator 262, and assists in maintaining the temperature in the system oil separator 262 within a working range. Coupled to the system oil separator 262 is a switch or transducer 292, such as a low pressure switch or pressure transducer, for example, that senses pressure information, and provides an output signal to the controller 216 through a suitable interface circuit programmed to detect when the pressure of the recovered refrigerant is down to 13 inches of mercury, for example. An oil separator drain valve 293 drains the recovered oil into a container 257. Finally, the recovered refrigerant flows through a normal discharge check valve 294 and into the storage tank 212.

The evacuation cycle begins by the opening of high pressure and low-pressure solenoids 276 and 278 and valve 296, leading to the input of a vacuum pump 258. Prior to opening valve 296, an air intake valve (not shown) is opened, allowing the vacuum pump 258 to start exhausting air. The vehicle's refrigerant system 200 is then evacuated by the closing of the air intake valve and opening the valve 296, allowing the vacuum pump 258 to exhaust any trace gases remaining until the pressure is approximately 29 inches of mercury, for example. When this occurs, as detected by pressure transducers 231 and 232, optionally, coupled to the high side 226 and low side 230 of the vehicle's refrigeration system 200 and to the controller 216, the controller 216 turns off valve 296 and this begins the recharging cycle.

The recharging cycle begins by opening charge valve 298 to allow the refrigerant in storage tank 212, which is at a pressure of approximately 70 psi or above, to flow through the high side of the vehicle's refrigeration system 200. The flow is through charge valve 298 for a period of time programmed to provide a full charge of refrigerant to the vehicle. Optionally, charge valve 299 may be opened to charge the low side. The charge valve 299 may be opened alone or in conjunction with charge valve 298 to charge the vehicle's refrigerant system 200. The storage tank 212 may be disposed on a scale (not shown) that measures the weight of the refrigerant in the storage tank.

Other components shown in FIG. 2 include an oil inject circuit having an oil inject valve 202 and an oil inject hose or line 211. The oil inject hose 211 is one example of a fluid transportation means for transmitting oil for the refrigerant recovery unit 100. The oil inject hose 211 may be one length of hose or multiple lengths of hose or tubing or any other suitable means for transporting fluid. The oil inject hose 211 connects on one end to an oil inject bottle 214 and on the other end couples to the refrigerant circuit in the refrigerant recovery unit 100. Disposed along the length of the oil inject hose 211 are the oil inject valve 202 and an oil check valve 204. The oil inject path follows from the oil inject bottle 214, through the oil inject solenoid 202, to the junction with the high side charge line, and to the vehicle's refrigerant system 200.

FIG. 2 also illustrates a vacuum pump oil drain circuitry 250 that includes a vacuum pump oil drain valve 252 that is located along a vacuum pump oil drain conduit 254 connecting a vacuum pump oil drain outlet 259 to the container 257 for containing the drained vacuum pump oil. The vacuum pump oil drain valve 252 may be an electronically activated solenoid valve controlled by controller 216. The connection may be a wireless or wired connection. In other embodiments the valve 252 may be a manually activated valve and manually actuated by a user. The conduit 254 may be a flexible hose or any other suitable conduit for provided fluid communication between the outlet 259 and the container 257.

FIG. 2 also illustrates an air purging apparatus 308. The air purging apparatus 308 allows the refrigerant recovery unit 100 to be purged of non-condensable gas, such as air. Air purged from the refrigerant recovery unit 100 may exit the storage tank 212, through an orifice 312, through a purging valve 314 and through an air diffuser 316. In some embodiments, the orifice may be 0.028 of an inch. A pressure transducer 310 may measure the pressure contained within the storage tank 212 and purge apparatus 308. The pressure transducer 310 may send the pressure information to the controller 216. And when the pressure is too high, as calculated by the controller, purging is required. The valve 314 may be selectively actuated to permit or not permit the purging apparatus 308 to be open to the ambient conditions. A temperature sensor 317 may be coupled to the main tank to measure the refrigerant temperature therein. The placement of the temperature sensor 317 may be anywhere on the tank or alternatively, the temperature sensor may be placed within a refrigerant line 322. The measured temperature and pressure may be used to calculate the ideal vapor pressure for the type of refrigerant used in the refrigerant recovery unit. The ideal vapor pressure can be used to determine when the non-condensable gases need to be purged and how much purging will be done in order for the refrigerant recovery unit to function properly.

High side clearing valves 318 may be used to clear out part of the high-pressure side of the system. The high side clearing valves 318 may include valve 323 and check valve 320. Valve 323 may be a solenoid valve. When it is desired to clear part of the high side, valve 323 is opened. Operation of the compressor 256 will force refrigerant out of the high pressure side through valves 323 and 320 and into the storage tank 212. During this procedure the normal discharge valve 284 may be closed.

A deep recovery valve 324 is provided to assist in the deep recovery of refrigerant. When the refrigerant from the refrigerant system 200 has, for the most part, entered into the refrigerant recovery unit 100, the remaining refrigerant may be extracted from the refrigerant system 200 by opening the deep recovery valve 324 and turning on the vacuum pump 258.

In another embodiment, in order to charge the refrigerant system 200, the power charge valve 326 may be opened and a tank fill structure 332 may be used. Alternatively or in addition to, the tank fill structure 332 may also be used to fill the storage tank 212. In order to obtain refrigerant from a refrigerant source, the refrigerant recovery unit 100 may include the tank fill structure 332, and valves 328 and 330. The tank fill structure 332 may be configured to attach to a refrigerant source. The valve 330 may be a solenoid valve and the valve 328 may be a check valve. In other embodiments, valve 330 may be a manually operated valve.

When it is desired to allow refrigerant from a refrigerant source to enter the refrigerant recovery unit 100, the tank fill structure 332 is attached to the refrigerant source and the tank fill valve 330 is opened. The check valve 328 prevents refrigerant from the refrigerant recovery unit 100 from flowing out of the refrigerant recovery unit 100 through the tank fill structure 332. When the tank fill structure 332 is not connected to a refrigerant source, the tank fill valve 330 is kept closed. The tank fill valve 330 may be connected to and controlled by the controller 216.

The tank fill structure 332 may be configured to be seated on the scale 334 configured to weigh the tank fill structure 332 in order to determine an amount of refrigerant stored in the tank fill structure 332. The scale 334 may be operatively coupled to the controller 216 and provide a measurement of a weight of the tank fill structure 332 to the controller 216. The controller 216 may cause a display of the weight of the tank fill structure 332 on the display 110.

Figure 3:
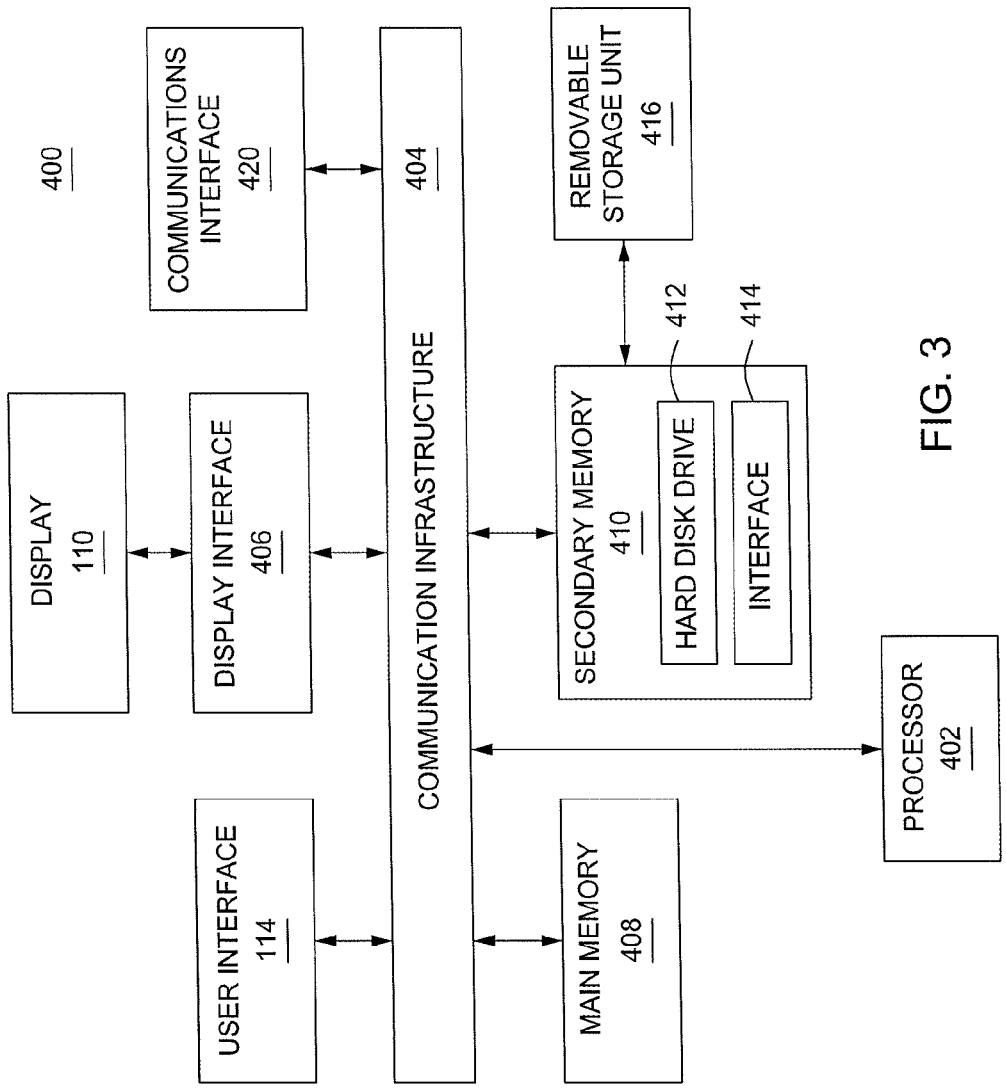
FIG. 3 is a schematic illustrating aspects of a control system, in accordance with an embodiment of the present invention.

Aspects of the refrigerant recovery unit 100 may be implemented via control system 400 using software or a combination of software and hardware. In one variation, aspects of the present invention may be directed toward a control system 400 capable of carrying out the functionality described herein. An example of such a control system 400 is shown in FIG. 3.

Control system 400 may be integrated with the controller 216 to permit, for example, automation of the recovery, evacuation, and recharging processes and/or manual control over one or more of each of the processes individually. In one embodiment, the control system 400 allows the refrigerant recovery unit to direct communicate and diagnose the vehicle under service. In another embodiment, the control system 400 allows for communication with a diagnostic tool, such as a VCI, that is coupled to the vehicle under service. It should be understood that the VCI does not have to be coupled to a vehicle in order to communicate with the refrigerant recovery unit 100. This allows the refrigerant recovery unit 100 to receive information from the vehicle such as VIN (vehicle identification number), manufacturer, make, model, and odometer information, and vehicle sensor data that pertains to the heating, ventilation, and air conditioning sensors and systems on the vehicle. Data could include A/C and HVAC system sensor readings, A/C and HVAC related diagnostic trouble codes, system pressures, and interactive tests, like actuating of various components, such as a fan control. All of this data and information would be displayed on the display 110 of the refrigerant recovery unit 100. Menu selections, diagnostic trouble codes, and interactive tests may be displayed and certain diagnostic may be performed using the refrigerant recovery unit.

The control system 400 may also provide access to a configurable database of vehicle information so the specifications pertaining to a particular vehicle, for example, may be used to provide exacting control and maintenance of the functions described herein. The control system 400 may include a processor 402 connected to a communication infrastructure 404 (e.g., a communications bus, cross-over bar, or network). The various software and hardware features described herein are described in terms of an exemplary control system. A person skilled in the relevant art(s) will realize that other computer related systems and/or architectures may be used to implement the aspects of the disclosed invention.

The control system 400 may include a display interface 406 that forwards graphics, text, and other data from memory and/or the user interface 114, for example, via the communication infrastructure 404 for display on the display 110. The communication infrastructure 404 may include, for example, wires for the transfer of electrical, acoustic and/or optical signals between various components of the control system and/or other well-known means for providing communication between the various components of the control system, including wireless means. The control system 400 may include a main memory 408, preferably random access memory (RAM), and may also include a secondary memory 410. The secondary memory 410 may include a hard disk drive 412 or other devices for allowing computer programs including diagnostic database (DTC information and repair and diagnostic information) or other instructions and/or data to be loaded into and/or transferred from the control system 400. Such other devices may include an interface 414 and a removable storage unit 416, including, for example, a Universal Serial Bus (USB) port and USB storage device, a program cartridge and cartridge interface (such as that found in video game devices), a removable memory chip (such as an erasable programmable read only memory (EPROM), or programmable read only memory (PROM)) and associated socket, and other removable storage units 416 and interfaces 414.

The control system 400 may also include a communications interface 420 for allowing software and data to be transferred between the control system 400 and external devices. Examples of a communication interfaces include a modem, a network interface (such as an Ethernet card), a communications port, wireless transmitter and receiver, Bluetooth, Wi-Fi, infra-red, cellular, satellite, a Personal Computer Memory Card International Association (PCMCIA) slot and card, etc.

The control system 400 also includes transceivers and signal translators necessary to communicate with the vehicle electronic control units in various communication protocols, such as J1850 (VPM and PWM), ISO 9141-2 signal, communication collision detection (CCD) (e.g., Chrysler collision detection), data communication links (DCL), serial communication interface (SCI), Controller Area Network (CAN), Keyword 2000 (ISO 14230-4), OBD II or other communication protocols that are implemented in a vehicle. This allows the refrigerant recovery unit to communicate directly with the vehicle without the VCI (e.g., directly connected to the vehicle) or while the VCI is simply acting as a pass through.

A software program (also referred to as computer control logic) may be stored in main memory 408 and/or secondary memory 410. Software programs may also be received through communications interface 420. Such software programs, when executed, enable the control system 400 to perform the features of the present invention, as discussed herein. In particular, the software programs, when executed, enable the processor 402 to perform the features of the present invention. Accordingly, such software programs may represent controllers of the control system 400.

In variations where the invention is implemented using software, the software may be stored in a computer program product and loaded into control system 400 using hard drive 412, removable storage drive 416, and/or the communications interface 420. The control logic (software), when executed by the processor 402, causes the controller 216, for example, to perform the functions of the invention as described herein. In another variation, aspects of the present invention can be implemented primarily in hardware using, for example, hardware components, such as application specific integrated circuits (ASICs), field programmable gate array (FPGA). Implementation of the hardware state machine so as to perform the functions described herein will be apparent to persons skilled in the relevant art(s).

Figure 4:
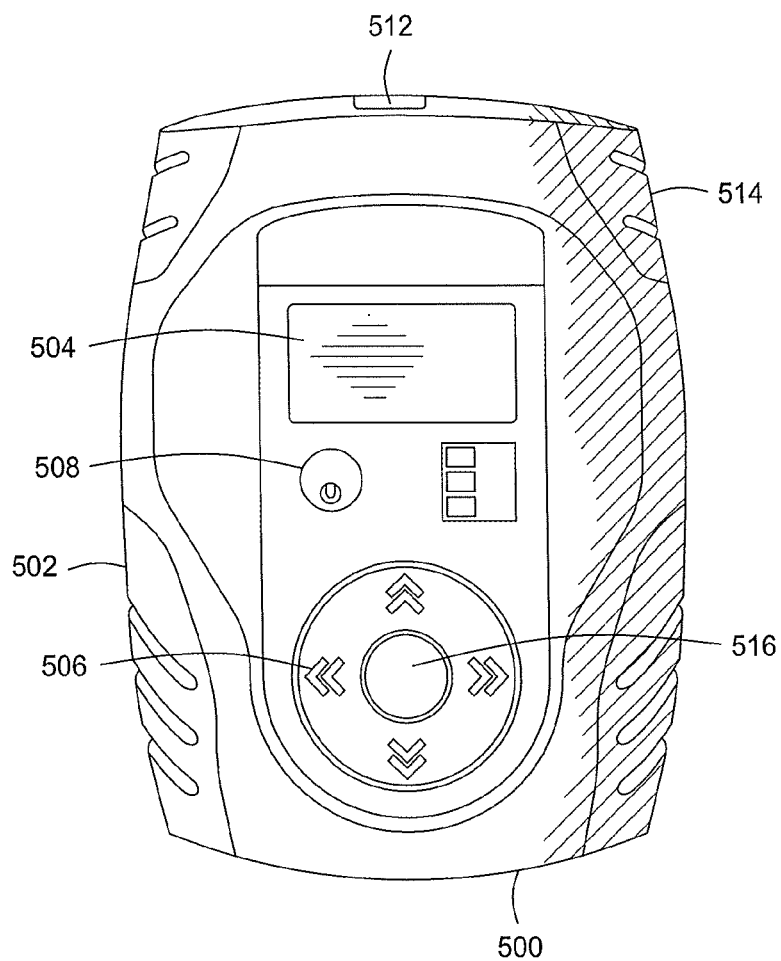
FIG. 4 is a vehicle communication interface that communicates with refrigerant recovery unit according to an embodiment of the present invention.

FIG. 4 is a plan view illustrating a diagnostic tool 500 according to an embodiment of the invention. The diagnostic tool 500 can be any computing device, such as the Honda VCI from Service Solutions U.S. LLC in Warren, Mich. The diagnostic tool 500 includes a housing 502 to house the various components of the diagnostic tool, such as a display 504, a user interface 506, a power key 508, a memory card reader (optional), a connector interface 512 and a connection 514.

The display 504 can be any type of display, for example, a liquid crystal display (LCD), a video graphics array (VGA), a touch display (which can also be a user interface), etc. The display can turn OFF after a certain period of time that the tool is not being used. For example, when no buttons are pressed or no data being retrieved from the vehicle for ten minutes, five minutes, three minutes or 1 minute. However, any time period can be set for turning OFF the display so that the battery (internal) can be conserved.

The user interface 506 allows the user to interact with the diagnostic tool 500 in order to operate the diagnostic tool as desired. The user interface 506 can include scroll device, function keys, arrow keys or any other type of keys that can manipulate the diagnostic tool 500 in order to operate various menus that are presented on the display.

The keys can also include a "back" or "enter" or a "code connect" 516 key. Once activated, the code connect 516 can display additional information about a DTC or other diagnostic information as discussed herein. The input device 506 can also be a mouse or any other suitable input device, including a keypad, or a scanner. The user interface 506 can also include numbers or be alphanumeric.

The power key 508 allows the user to turn the diagnostic tool 500 ON and OFF, as required. The diagnostic tool 500 can automatically turn OFF after a user-selectable period of time of inactivity (e.g. no buttons pressed or data being collected from the vehicle). The power for the diagnostic tool 500 can be supplied from internal batteries of the tool or from the vehicle's battery when the tool is coupled to the DLC or from a connection to a computing device, such as through a USB connection. If the power source is the vehicle or through a connection (such as a computing device), then the tool can power on automatically once the tool is connected to the vehicle or computing device.

Memory card reader (optional) can be a single type card reader, such as a compact flash card, floppy disc, memory stick, secure digital memory, flash memory or other types of memory. The memory card reader can be a reader that reads more than one of the aforementioned memories such as a combination memory card reader. Additionally, the memory card reader can also read any other computer readable medium, such as CD, DVD, UMD, etc. In one embodiment, the memory card reader can be used to update the software or databases that are in the diagnostic tool 500.

The connector interface 512 allows the diagnostic tool 100 to connect to an external device, such as an ECU of a vehicle, a computing device, an external communication device (such as a modem), a network, etc. through a wired or wireless connection (not shown). In addition, a connection 514 can also be included on the diagnostic tool 500 in order to connect to USB, FIREWIRE, modem, RS232, RS485, and other connections to communicate with external devices, such as a hard drive, USB drive, CD player, DVD player, UMD player, PC or other computer readable medium devices.

Figure 5:
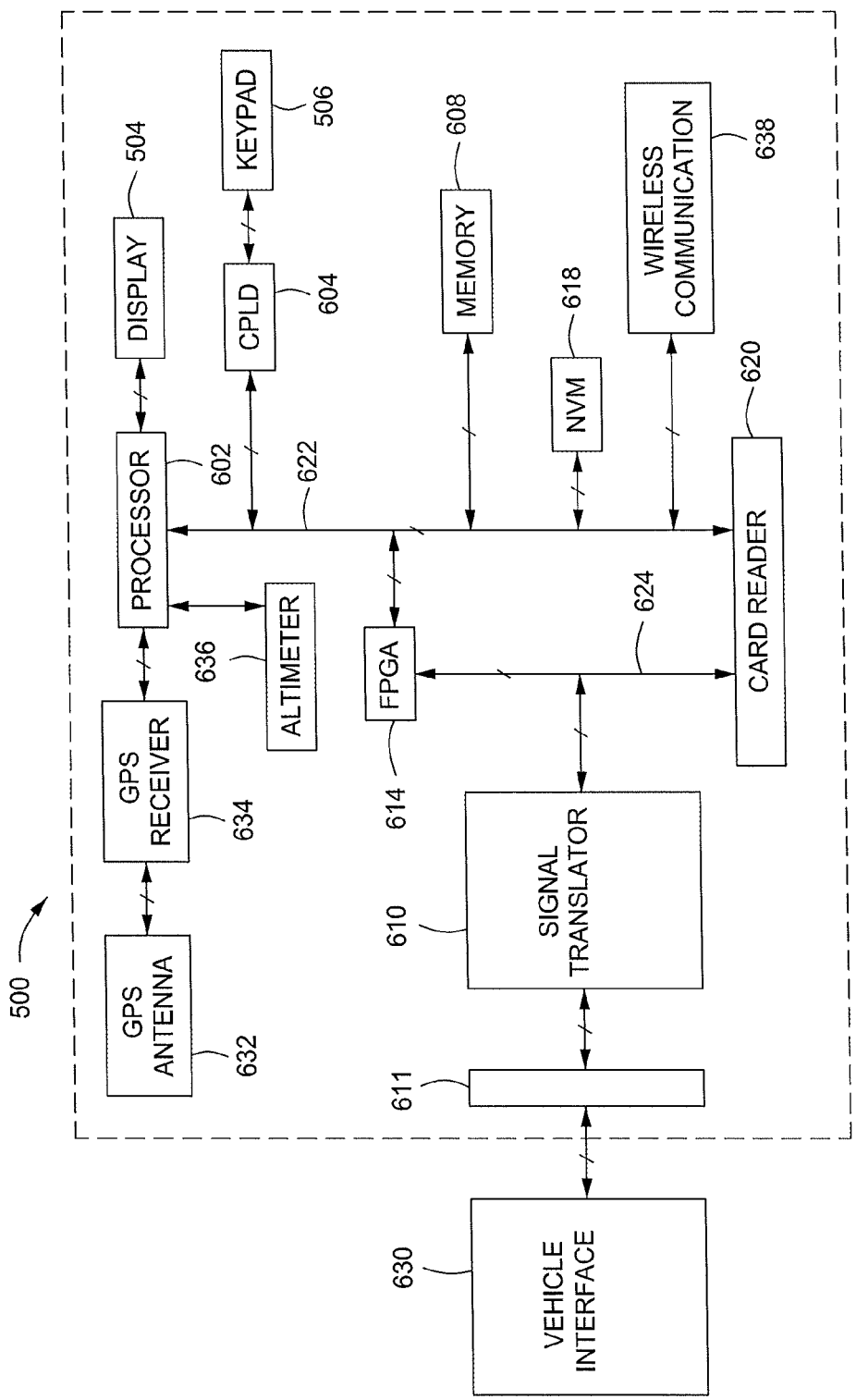
FIG. 5 is a schematic illustrating components of the vehicle communication interface according to an embodiment of the invention.

FIG. 5 is a block diagram of the components of the diagnostic tool 500. In FIG. 5, the diagnostic tool 500 according to an embodiment of the invention includes a processor 602, a field programmable gate array (FPGA) 614, a first system bus 624, the display 504, a complex programmable logic device (CPLD) 604, the user interface in the form of a keypad 506, a memory subsystem 608, an internal non-volatile memory (NVM) 618, a card reader 620 (optional), a second system bus 622, a connector interface 611, a selectable signal translator 610, a GPS antenna 632, a GPS receiver 634, an optional altimeter 636 and wireless communication circuit 638. A vehicle communication interface 630 is in communication with the diagnostic tool 500 through connector interface 611 via an external cable (not shown).

Selectable signal translator 610 communicates with the vehicle communication interface 630 through the connector interface 611. Signal translator 610 conditions signals received from an ECU unit through the vehicle communication interface 630 to a conditioned signal compatible with diagnostic tool 500. Signal translator 610 can communicate with, for example, the following communication protocols: J1850 (VPM and PWM), ISO 9141-2 signal, communication collision detection (CCD) (e.g., Chrysler collision detection), data communication links (DCL), serial communication interface (SCI), Controller Area Network (CAN), Keyword 2000 (ISO 14230-4), OBD II or other communication protocols that are implemented in a vehicle.

The circuitry to translate and send in a particular communication protocol can be selected by FPGA 614 (e.g., by tri-stating unused transceivers) or by providing a keying device that plugs into the connector interface 611 that is provided by diagnostic tool 500 to connect diagnostic tool 500 to the vehicle communication interface 630. Signal translator 610 is also coupled to FPGA 614 and the card reader 620 via the first system bus 624. FPGA 614 transmits to and receives signals (i.e., messages) from the ECU unit through signal translator 610.

The FPGA 614 is coupled to the processor 602 through various address, data and control lines by the second system bus 622. FPGA 614 is also coupled to the card reader 620 through the first system bus 624. The processor 602 is also coupled to the display 504 in order to output the desired information to the user. The processor 602 communicates with the CPLD 604 through the second system bus 622. Additionally, the processor 602 is programmed to receive input from the user through the user interface 506 via the CPLD 604. The CPLD 604 provides logic for decoding various inputs from the user of the diagnostic tool 500 and also provides glue-logic for various other interfacing tasks.

Memory subsystem 608 and internal non-volatile memory 618 are coupled to the second system bus 622, which allows for communication with the processor 602 and FPGA 614. Memory subsystem 608 can include an application dependent amount of dynamic random access memory (DRAM), a hard drive, and/or read only memory (ROM). Software to run the diagnostic tool 500 can be stored in the memory subsystem 608, including any database. The database can include diagnostic information and other information related to vehicles. In one embodiment, the database can include additional information such as possible fixes for a particular DTC retrieved from a vehicle.

The database can contain information about additional databases include the additional information but located at a remote location instead of being local on the diagnostic tool. The remote database can be accessed via a wireless or wired connection. The database can also be stored on an external memory, such as a compact flash card or other memories and accessed locally by the diagnostic tool.

Internal non-volatile memory 618 can be an electrically erasable programmable read-only memory (EEPROM), flash ROM, or other similar memory. Internal non-volatile memory 618 can provide, for example, storage for boot code, self-diagnostics, various drivers and space for FPGA images, if desired. If less than all of the modules are implemented in FPGA 614, memory 618 can contain downloadable images so that FPGA 614 can be reconfigured for a different group of communication protocols.

The GPS antenna 632 and GPS receiver 634 may be mounted in or on the housing 502 or any combination thereof. The GPS antenna 632 electronically couples to the GPS receiver 634 and allows the GPS receiver to communicate (detects and decodes signals) with various satellites that orbit the Earth. In one embodiment, the GPS antenna and GPS receiver are one device instead of two. The GPS receiver 634 and GPS antenna 632 electronically couple to the processor 602, which is coupled to memory 608, NVM 618 or a memory card in the card reader 620. The memory can be used to store cartographic data, such as electronic maps. The diagnostic tool can include all the maps for the U.S. (or country of use), North America or can have the region or state where the diagnostic tool is located. In alternative embodiments, the diagnostic tool can have all the maps of the world or any portion of the world desired by the user. This allows the diagnostic tool to be a GPS device so that a driver can drive from one location to another. The maps may be over lay or incorporated with traffic, local events, and location of other GPS devices (smart phones) and other information that can be useful to the technician. By being able to locate other diagnostic tools with GPS, then the technicians may be able to use the diagnostic tools to locate each other in order to conduct a meeting or have a social event.

The GPS receiver communicates with and "locks on" to a certain number of satellites in order to have a "fix" on its global location. Once the location is fixed, the GPS receiver, with the help of the processor, can determine the exact location including longitude, latitude, altitude, velocity of movement and other navigational data of the diagnostic tool 500.

Should GPS receiver be unable to lock onto the minimum number of satellites to determine the altitude or unable to determine the altitude for any reason, the altimeter 636 can be used to determine the altitude of the diagnostic tool 500. The altimeter 636 is electronically coupled to the processor 602 and can provide the altitude or elevation of the diagnostic tool 500. The altimeter can be coupled to a barometric pressure sensor (not shown) in order to calibrate the elevation measurements determined by the altimeter. The sensor can be positioned interior or exterior to the housing 502 of the diagnostic tool 500. Minor atmospheric pressure changes can affect the accuracy of the altimeter, thus, diagnostic tool can correct for these changes by using the sensor in conjunction with the altimeter along with a correction factor known in the art.

Wireless communication circuit 638 communicates with the processor 602 via the second bus system 622. The wireless communication circuit can be configured to communicate via RF (radio frequency), satellites, cellular phones (analog or digital), Bluetooth®, Wi-Fi, Infrared, Zigby, Local Area Networks (LAN), WLAN (Wireless Local Area Network), other wireless communication configurations and standards or a combination thereof. The wireless communication circuit allows the diagnostic tool to communicate with other devices wirelessly including the refrigeration recovery unit 100 in order to transmit wirelessly the vehicle diagnostic information retrieved by the diagnostic tool 500. The wireless communication circuit includes an antenna built therein and being housed within the housing or can be externally located on the housing.

A diagnostic tool program is needed to operate the diagnostic tool to perform the various diagnostic tests. Different vehicle manufacturers (or even within the same manufacturer) require the diagnostic tool to operate using different programs and communication protocols. The vehicle information (make, model, year, etc.) may be inputted into the diagnostic tool through the user interface 506 in a manner such as, for example, scanning a bar coded VIN number located on the vehicle to be serviced or inputting information of the vehicle, such as year, make and model. In another embodiment, the diagnostic tool can automatically scan for the vehicle information, for example information from the ECUs of the vehicle, to determine the correct vehicle or communication protocol used by the vehicle.

Once the diagnostic tool program is operating and the diagnostic tool is connected to the DLC, the DTCs and other diagnostic data can be retrieved from the vehicle. In one embodiment, the available vehicle diagnostic data can be automatically scan from the vehicle and displayed on the display. The display can include a list of data category (e.g., I/M monitors, DTCs, state OBD check, etc.) that can be available for that vehicle or a generic vehicle and a check mark or other indicators can be next to a category that has vehicle data that has been retrieved from the vehicle. This allows the technician to hone in on the information that he wants or be able to quickly determine what diagnostic data is available for the vehicle under test.

Figure 6:
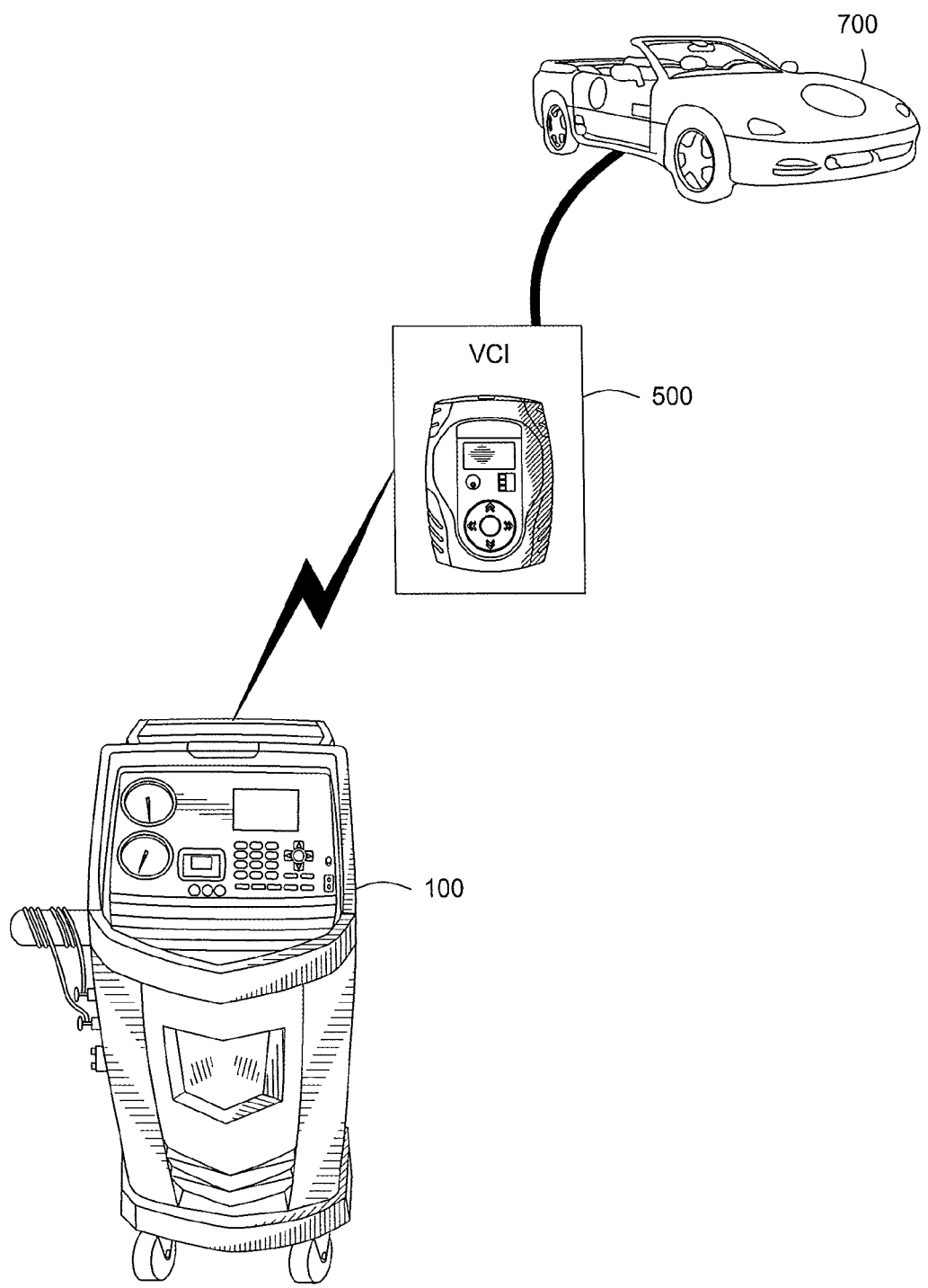
FIG. 6 illustrates the vehicle communication interface coupled to a vehicle and communicating with the refrigerant recovery unit of FIG. 1 according to an embodiment of the invention.

FIG. 6 illustrates the refrigerant recovery unit 100 communicating with the diagnostic tool 500 that is connected to the vehicle 700. The diagnostic tool is connected to the vehicle's data link connector. In operation, the diagnostic tool 500 can be used to collect vehicle information and diagnostic data for the vehicle under the test. In one embodiment, the diagnostic tool can be used to collect vehicle information such as make, model and year, owner information, VIN, previous diagnosis performed, and location of the vehicle (indirectly from the GPS information of the diagnostic tool 500). This type of vehicle information may be manually entered by the user or collected via a scanning system such as a bar code reader or RFID reader.

In another embodiment, the diagnostic tool may be coupled to the DLC of the vehicle in order to retrieve vehicle information including diagnostic information. The diagnostic information may include DTCs that are set in the vehicle, or vehicle operating parameters from various sensors (temperature, pressure, throttle). The vehicle information can be transmitted via a wired or wireless connection from the diagnostic tool 500 to the refrigerant recovery unit 100.

In another embodiment, the diagnostic tool 500 can act as a pass through device that simply passes through the vehicle diagnostic data to the refrigerant recovery unit 100. In this embodiment, the refrigerant recovery unit processes the diagnostic information and provides the fixes to the technician. The refrigerant recovery unit can include the communication protocols that are needed to communicate with the various computers or electronic control units of the vehicle. Additionally, the diagnostic software can be stored in the memory of the refrigerant recovery unit to diagnose the vehicle and clear the set DTCs.

The refrigerant recovery unit 100 can use the vehicle information including the DTCs and other diagnostic data to diagnose any issues with the vehicle. The refrigerant recovery unit can access diagnostic information including fixes that are stored in its memory as described herein. In the event that additional information is needed to diagnose or fix the vehicle, the refrigerant recovery unit or the diagnostic tool can retrieve it from remote computing device using the respective communication interface.

The communication between the refrigerant recovery unit and the diagnostic tool may be in any communication protocols, such as Wi-Fi, Bluetooth, Zigbee and other protocols described herein. The communication connection may be a wired or wireless connection.

Figure 7:
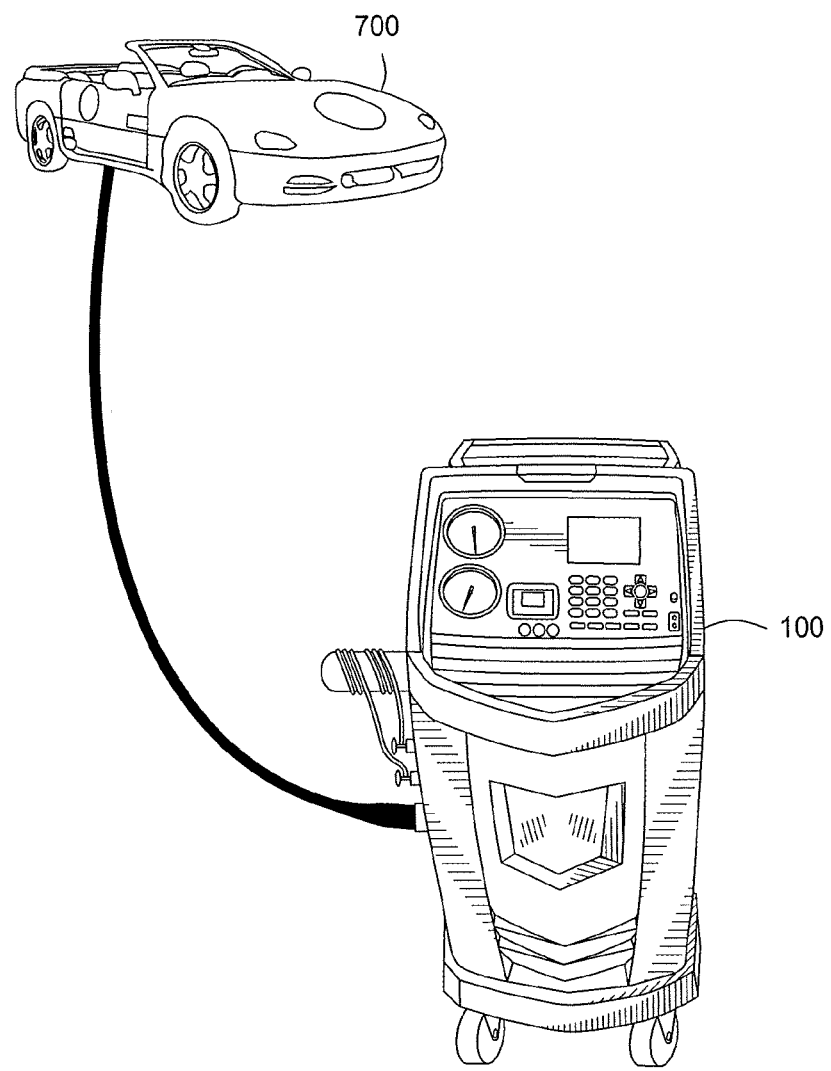
FIG. 7 illustrates the refrigerant recovery unit of FIG. 1 directly coupled to and communicating with the vehicle according to an embodiment of the invention.

FIG. 7 illustrates the refrigerant recovery unit of FIG. 1 directly coupled to and communicating with the vehicle according to an embodiment of the invention. A communication cable 702 is connected to the vehicle connector interface 130 of the refrigerant recover unit 100 and to the data link connector (not shown) in the vehicle 700. In this embodiment, the diagnostic tool is not required to diagnose and retrieve vehicle information and data from the vehicle.

In operation, with the communication cable connecting the vehicle 700 with the refrigerant recovery unit, data including diagnostic information and vehicle information can be retrieved from the vehicle for processing. With the vehicle information retrieved from the vehicle via the communication cable (or by the manual entry), the refrigerant recovery unit can identify the appropriate diagnostic database to use to diagnose the vehicle under test. Vehicle diagnostic data can then be retrieved from the vehicle, such as DTCs for processing. Once the problems with the vehicle are identified, the appropriate fixes can be provided to the user. The fixes can be provided from a database stored in the refrigerant recovery unit or retrieved from an external source such as an external memory or a remote database on a remote computing device.

It is to be understood that any feature described in relation to any one aspect may be used alone, or in combination with other features described, and may also be used in combination with one or more features of any other of the disclosed aspects, or any combination of any other of the disclosed aspects.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A refrigerant recovery unit, comprising:
a refrigerant storage unit configured to store a refrigerant;
a refrigerant circuit configured to recover and recharge the refrigerant in a refrigerant system of a vehicle;
a communication interface configured to communicate with a vehicle diagnostic tool and the vehicle using a vehicle communication protocol, wherein diagnostic information including diagnostic trouble codes is passed through to the refrigerant recovery unit to be processed and is not processed by the diagnostic tool, and wherein fixes are provided to a user based on the diagnostic information;
a processor configured to control the refrigerant recovery unit;
a memory to store diagnostic software and operating software to operate the refrigerant recovery unit; and
a pair of hoses configured to connect to the refrigerant system of the vehicle.

2. The refrigerant recovery unit according to claim 1 further comprising:
an input interface configured to receive an input from the user; and a display configured to display information to the user.

3. The refrigerant recovery unit according to claim 1, wherein the communication interface receives diagnostic information of the vehicle through the diagnostic tool.

4. The refrigerant recovery unit according to claim 1, wherein the fixes are retrieved from a remote computing device.

5. The refrigerant recovery unit according to claim 3, wherein the refrigerant recovery unit processes the diagnostic information and provides top fixes to the user on a display.

6. The refrigerant recovery unit according to claim 1, wherein the communication interface includes communication protocols to communicate directly with the electronic control units of the vehicle.

7. A refrigerant recovery unit, comprising:
   means for storing refrigerant;
   means for transferring refrigerant configured to recover and recharge the refrigerant in a refrigerant system of a vehicle;
   means for communicating configured to communicate with a vehicle diagnostic tool and with the vehicle using a vehicle communication protocol, wherein diagnostic information including diagnostic trouble codes is passed through to the refrigerant recovery unit to be processed and is not processed by the diagnostic tool, and wherein fixes are provided to a user based on the diagnostic information;
   means for controlling configured to control the refrigerant recovery unit;
   means for storing diagnostic software and operating software to operate the refrigerant recovery unit; and
   means for supplying refrigerant configured to connect to the refrigerant system of the vehicle.

8. The refrigerant recovery unit according to claim 7 further comprising: means for inputting configured to receive an input from the user; and means for displaying configured to display information to the user.

9. The refrigerant recovery unit according to claim 7, wherein the means for communicating receives diagnostic information of the vehicle through the diagnostic tool.

10. The refrigerant recovery unit according to claim 7 wherein the fixes are retrieved from a remote computing device.

11. The refrigerant recovery unit according to claim 9, wherein the refrigerant recovery unit processes the diagnostic information and provides top fixes to the user on means for displaying.

12. The refrigerant recovery unit according to claim 7, wherein the means for communicating includes communication protocols to communicate directly with the electronic control units of the vehicle.

13. A refrigerant recovery unit, comprising:
   a refrigerant storage unit configured to store a refrigerant;
   a refrigerant circuit configured to recover and recharge the refrigerant in a refrigerant system of a vehicle;
   a vehicle communication interface configured to communicate with a data link connector of a vehicle in a vehicle communication protocol, wherein the communication occurs even when a diagnostic tool simply passes through vehicle diagnostic information that includes diagnostic trouble codes without processing the information;
   a processor configured to control the refrigerant recovery unit;
   a memory to store diagnostic software and operating software to operate the refrigerant recovery unit; and
   a pair of hoses configured to connect to the refrigerant system of the vehicle, wherein fixes are provided to the user based on vehicle diagnostic information.

14. The refrigerant recover unit according to claim 13 further comprising:
   an input interface configured to receive an input from a user; and
   a display configured to display information to the user.

* * * * *